United States Patent
Hu

(10) Patent No.: US 12,316,956 B2
(45) Date of Patent: May 27, 2025

(54) SHOOTING METHOD, SHOOTING APPARATUS, AND ELECTRONIC DEVICE

(71) Applicant: VIVO MOBILE COMMUNICATION CO., LTD., Dongguan (CN)

(72) Inventor: Pengxiang Hu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 121 days.

(21) Appl. No.: 18/302,267

(22) Filed: Apr. 18, 2023

(65) Prior Publication Data

US 2023/0262320 A1 Aug. 17, 2023

Related U.S. Application Data

(63) Continuation of application No. PCT/CN2021/132386, filed on Nov. 23, 2021.

(30) Foreign Application Priority Data

Nov. 30, 2020 (CN) .......................... 202011379813.8

(51) Int. Cl.
*H04N 23/63* (2023.01)
*H04N 23/68* (2023.01)

(52) U.S. Cl.
CPC ....... *H04N 23/632* (2023.01); *H04N 23/6812* (2023.01)

(58) Field of Classification Search
CPC .... H04N 23/60; H04N 23/6812; H04N 23/90; H04N 23/45; H04N 23/651; H04N 23/632; H04N 5/2621; H04N 5/2625; H04N 5/144
See application file for complete search history.

(56) References Cited

U.S. PATENT DOCUMENTS

| 10,062,151 | B2 * | 8/2018 | Wang | G06T 5/73 |
| 10,171,753 | B2 * | 1/2019 | Wei | H04N 23/70 |
| 10,419,661 | B2 * | 9/2019 | Wei | H04N 23/667 |

(Continued)

FOREIGN PATENT DOCUMENTS

| CN | 103402044 A | 11/2013 |
| CN | 104104879 A | 10/2014 |

(Continued)

OTHER PUBLICATIONS

China National Intellectual Proprty Administration, International Search Report issued in corresponding Application No. PCT/CN2021/132386, mailed Jan. 29, 2022.

(Continued)

*Primary Examiner* — Pritham D Prabhakher
(74) *Attorney, Agent, or Firm* — Stites & Harbison, PLLC; Jeffrey A. Haeberlin

(57) ABSTRACT

This application discloses a shooting method, a shooting apparatus, and an electronic device, and pertains to the field of an imaging technology. The shooting method includes: a first camera captures a first picture, and a second camera captures a second picture, where the first picture includes an image in a current capture scene, the second camera is configured to capture a motion trajectory of a target moving object, and the first picture includes the target moving object; and synthesizing the first picture and the second picture, and outputting a target picture.

20 Claims, 12 Drawing Sheets

(56) References Cited

U.S. PATENT DOCUMENTS

| | | | |
|---|---|---|---|
| 11,140,330 B2* | 10/2021 | Yi | H04N 23/6811 |
| 11,282,397 B2* | 3/2022 | Sakamaki | G01S 7/41 |
| 11,620,780 B2* | 4/2023 | Lee | G02B 27/0101 |
| | | | 345/473 |
| 11,941,762 B2* | 3/2024 | Sonasath | G06F 3/041 |
| 2015/0077591 A1* | 3/2015 | Fujiwara | H04N 23/80 |
| | | | 348/234 |
| 2016/0173787 A1 | 6/2016 | Yun | |
| 2017/0085808 A1* | 3/2017 | Jiang | H04N 23/6811 |
| 2017/0208354 A1* | 7/2017 | Nazir Morcos | H04L 67/55 |
| 2017/0213324 A1 | 7/2017 | Wang et al. | |
| 2017/0213371 A1* | 7/2017 | Zou | G06T 11/00 |
| 2017/0257561 A1* | 9/2017 | Wei | H04N 23/64 |
| 2017/0280064 A1* | 9/2017 | Wei | H04N 23/70 |
| 2020/0005542 A1* | 1/2020 | Kocharlakota | G06T 19/006 |
| 2020/0312156 A1 | 10/2020 | Sakamaki et al. | |
| 2021/0174092 A1* | 6/2021 | Zhao | G06T 3/40 |
| 2021/0266443 A1* | 8/2021 | Yi | H04N 23/6812 |
| 2021/0350145 A1* | 11/2021 | Park | H04N 23/10 |
| 2021/0358158 A1* | 11/2021 | Peri | G06T 3/4007 |
| 2022/0108548 A1* | 4/2022 | Kim | G06V 10/22 |
| 2022/0156998 A1* | 5/2022 | Lee | G06N 20/00 |

FOREIGN PATENT DOCUMENTS

| | | |
|---|---|---|
| CN | 104134225 A | 11/2014 |
| CN | 105827946 A | 8/2016 |
| CN | 108769598 A | 11/2018 |
| CN | 104052913 B | 4/2019 |
| CN | 109803096 A | 5/2019 |
| CN | 110427823 A | 11/2019 |
| CN | 111083354 A | 4/2020 |
| CN | 111083391 A | 4/2020 |
| CN | 112188093 A | 1/2021 |
| JP | 2003-189154 A | 7/2003 |
| JP | 2008-219489 A | 9/2008 |
| JP | 2012-004763 A | 1/2012 |
| KR | 10-2016-0124874 A | 10/2016 |
| KR | 10-2020-0041981 A | 4/2020 |
| WO | 2018/119632 A1 | 7/2018 |
| WO | 2020/034083 A1 | 2/2020 |

OTHER PUBLICATIONS

Linares-Barranco, A., et al. "Low Latency Event-Based Filtering and Feature Extraction for Dynamic Vision Sensors in Real-Time FPGA Applications," IEEE Access, vol. 7, 2019.

European Patent Office, Extended European Search Report issued in corresponding Application No. EP 21896964 dated Feb. 16, 2024.

Korean Intellectual Property Office, Office Action issued in corresponding Application No. KR 10-2023-7021621 dated Apr. 25, 2024.

Japan Patent Office, Second Office Action issued in corresponding Application No. JP 2023-532613, dispatched Dec. 10, 2024. (Translation not readily available.).

Intellectual Property India, First Office Action issued in corresponding Application No. 202372035969 mailed Dec. 31, 2024.

* cited by examiner

SHOOTING METHOD, SHOOTING APPARATUS, AND ELECTRONIC DEVICE

CROSS-REFERENCE TO RELATED APPLICATIONS

This application is a continuation of International Application No. PCT/CN2021/132386, filed on Nov. 23, 2021, which claims priority to Chinese Patent Application No. 202011379813.8, entitled "SHOOTING METHOD, SHOOTING APPARATUS, AND ELECTRONIC DEVICE", filed on Nov. 30, 2020, which is incorporated herein by reference in its entirety.

TECHNICAL FIELD

This application pertains to the field of an imaging technology, and in particular, to a shooting method, a shooting apparatus, and an electronic device.

BACKGROUND

A light painting camera, as a shooting mode, is used to perform shooting with a strip-shaped dynamic effect in a specific dynamic scene, such as starry sky, a waterfall, a stream, a road vehicle, or waving a luminous object. During implementation of this application, the inventor finds that the prior art has the following problems. On the one hand, a current light painting camera consumes a lot of power during shooting, and a device of the light painting camera generates heat severely. On the other hand, the current light painting camera cannot adjust a motion trajectory of light when the motion trajectory of light is not satisfactory. Therefore, shooting can only be performed again.

SUMMARY

According to a first aspect of this application, a shooting method is provided, which includes:
   capturing, by a first camera, a first picture, and capturing, by a second camera, a second picture, where the first picture includes an image in a current capture scene, the second camera is configured to capture a motion trajectory of a target moving object, and the first picture includes the target moving object; and
   synthesizing the first picture and the second picture, and outputting a target picture.

According to a second aspect of this application, a shooting apparatus is provided, which includes:
   a first capturing module, configured to capture a first picture by a first camera, and capture a second camera by a second picture, where the first picture includes an image in a current capture scene, the second camera is configured to capture a motion trajectory of a target moving object, and the first picture includes the target moving object; and
   a first synthesis module, configured to synthesize the first picture and the second picture, and output a target picture.

According to a third aspect of this application, an electronic device is provided. The electronic device includes a processor, a memory, and a program or an instruction stored in the memory and capable of running on the processor. When the program or the instruction is executed by the processor, the steps of the method according to the first aspect are implemented.

According to a fourth aspect of this application, a readable storage medium is provided. The readable storage medium stores a program or an instruction, and when the program or the instruction is executed by a processor, the steps of the method in the first aspect are implemented.

According to a fifth aspect of this application, a chip is provided. The chip includes a processor and a communication interface. The communication interface is coupled to the processor, and the processor is configured to run a program or an instruction to implement the method in the first aspect.

According to a sixth aspect of this application, an electronic device is provided, which includes a step in which the electronic device is configured to perform the shooting method according to the first aspect.

According to a seventh aspect of this application, a computer program product is provided. The computer program product may be executed by a processor to implement the steps of the shooting method according to the first aspect.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that the data used in this way is interchangeable in appropriate circumstances so that the embodiments of this application described can be implemented in other orders than the order illustrated or described herein. In addition, in the specification and the claims, "and/or" represents at least one of connected objects, and a character "/" generally represents an "or" relationship between associated objects.

In the prior art, in a shooting mode of a light painting camera, a frame is caught by an RGB sensor, and background picture processing is performed through an algorithm. An interesting picture is generated in a fixed short period of time. During shooting, it is necessary to constantly catch a frame in a current capture scene. Therefore, power consumption and heat generation of a device are severe. In addition, a motion trajectory of a moving object is completely bound to a photographic plate, and cannot be effectively separated from the photographic plate, and the motion trajectory of the moving object cannot be adjusted separately, resulting in poor operability.

With reference to the accompanying drawings, a shooting method, a shooting apparatus, an electronic device, and a readable storage medium provided in the embodiments of this application are described in detail by using embodiments and application scenes of the embodiments.

An embodiment of this application provides a shooting method. The shooting method may be performed by a terminal with a shooting function, including but not limited to a mobile terminal, a camera, a control apparatus of the terminal, or the like.

The shooting method is used to obtain a light painting photo. The light painting photo includes a motion trajectory of light.

Figure 1:
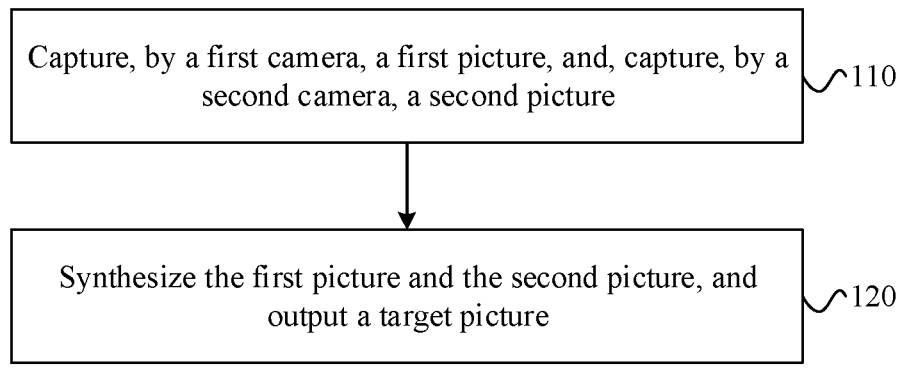
FIG. 1 is a flowchart of a shooting method according to an embodiment of this application.

As shown in FIG. 1, the shooting method includes step 110 and step 120.

Step 110: A first camera captures a first picture, and a second camera captures a second picture. The first picture includes an image in a current capture scene. The second camera is configured to capture a motion trajectory of a target moving object. The first picture includes the target moving object.

It should be noted that the first picture is used to generate a background picture of a light painting photo, for example, a background picture of a light painting photo obtained by editing the first picture. The background picture of the light painting photo includes other images in the light painting photo except the motion trajectory of the target moving object.

Taking shooting a street night scene including vehicle flow as an example, the first picture may include basically static objects such as a road, a fence on the road, a plant and building on the roadside. Alternatively, the first picture may further include a moving object with weak light intensity, such as a pedestrian. The second picture may include only a motion trajectory of a car lamp on a running vehicle, and the second picture may be represented as one or more light bands.

The first camera may be an RGB sensor.

The second camera is configured to capture the motion trajectory of the target moving object. In implementation, the second camera may be a DVS (Dynamic Vision Sensor).

The DVS captures a dynamic change in a scene in an event-driven manner. Unlike a traditional camera, no concept of "frame" exists in the DVS. When there is a change in a real scene, the DVS generates some pixel-level outputs, that is, an event.

On the one hand, the DVS requires an extremely small quantity of data storage and computing resources, and has extremely low latency in microsecond level. In addition, the DVS can record only a moving object and has no perceptual ability for a static background image.

On the other hand, in some scenes, brightness of a moving object is low. For example, for a waterfall without strong light, the RGB sensor cannot effectively capture a motion trajectory of the moving object, but the DVS can accurately capture the motion trajectory.

That is, the DVS captures the motion trajectory of the moving object without limitation by a fixed time and with less power consumption.

The second picture may be the motion trajectory of the target moving object in the light painting photo. Alternatively, the motion trajectory of the target moving object in the light painting photo may be generated based on the second picture.

The first camera and the second camera are configured to capture an object in the same capture scene.

Take shooting waterfall as an example, and waterfall water flow is a target moving object. The first picture includes the waterfall water flow and another background within a lens range, such as a static stone or a tree. The second camera is configured to capture a motion trajectory of the waterfall water flow. The second picture includes only the motion trajectory of the waterfall water flow.

In some embodiments, before step 110: a first camera captures a first picture, and a second camera captures a second picture, the shooting method may further include:

receiving an input performed by a user for enabling a camera; and enabling the first camera and the second camera in response to the input for enabling the camera.

The input performed by a user for enabling a camera may be expressed in at least one of the following manners: touch input, voice input, physical key input, or the like, which will not be described herein.

In this step, when a terminal receives the input, the terminal enables the first camera and the second camera simultaneously.

In implementation, step 110 may be automatically triggered. For example, when shooting a vehicle flow on the road at night, the terminal is provided with a photosensitive sensor. In a case that light intensity detected by the photosensitive sensor is greater than a target intensity value, the first camera and the second camera are controlled to automatically enable, to capture the first picture and the second picture.

Definitely, step 110 may also be triggered manually.

For example, in a scene in which the user performs shooting manually, before step 110, the method may further include:

receiving an input performed by a user for starting shooting.

It should be noted that in this step, the input for starting shooting is used to trigger the first camera and the second camera to capture a picture.

The input for starting shooting may be expressed in at least one of the following manners.

First, the input for starting shooting may be expressed as touch input, including but not limited to tap input, slide input, and press input.

In this implementation, the receiving an input performed by a user for starting shooting may be represented as receiving a touch operation performed by a user in a display region of a terminal display screen.

To reduce a misoperation rate of the user, a region of action of the input may be limited to a region, such as a lower middle region of the display region of the terminal display screen. Alternatively, in a case that a status of a shooting preview interface is displayed in a current interface, a target control is displayed in the current interface. The input for starting shooting may be implemented by touching the target control.

Second, the input for starting shooting may be represented as a physical key input.

In this embodiment, a body of the terminal is provided with a physical key corresponding to shooting. The receiving an input performed by a user for starting shooting may be represented as receiving an input performed by a user for pressing the corresponding physical key.

Third, the input for starting shooting may be represented as a voice input.

In this embodiment, the terminal may trigger, when receiving a voice such as "light painting shooting", the first camera and the second camera to capture pictures.

Definitely, in another embodiment, the input for starting shooting may also be represented in another form, including but not limited to a character input or the like, which can be determined according to actual needs, and is not limited in this embodiment of this application.

After receiving the input for starting shooting, the terminal may control, in response to the input for starting shooting, the first camera to capture the first picture and the second camera to capture the second picture.

The first camera and the second camera may start capturing synchronously, or the second camera starts capturing the second picture only after the first camera captures the first picture, or the first camera captures the first picture after the second camera captures the second picture.

In some embodiments, the shooting method may further include:
  receiving an input performed by a user for stopping shooting; and
  controlling, in response to the input for stopping shooting, the second camera to stop picture acquisition, and generating the second picture according to a picture captured by the second camera between the input for starting shooting and the input for stopping shooting.

It should be noted that, in this step, the input for stopping shooting is used to trigger the second camera to end picture capturing.

The input for stopping shooting may be expressed in at least one of the following manners.

First, the input for stopping shooting may be expressed as touch input, including but not limited to tap input, slide input, and press input.

In this implementation, the receiving an input performed by a user for stopping shooting may be represented as receiving a touch input performed by a user in the display region of the terminal display screen.

To reduce a misoperation rate of the user, an action region of the input may be limited to a region, such as a lower middle region of the display region of the terminal display screen. Alternatively, in a case that a status of a shooting preview interface is displayed in a current interface, a target control is displayed in the current interface. The input for stopping shooting may be implemented by touching the target control.

Second, the input for stopping shooting may be represented as a physical key input.

In this embodiment, a body of the terminal is provided with a physical key corresponding to shooting. The receiving an input performed by a user for stopping shooting may be represented as receiving an input performed by a user for pressing the corresponding physical key.

Third, the input for stopping shooting may be represented as a voice input.

In this embodiment, the terminal may trigger, when receiving a voice such as "light painting shooting completed", the second camera to end the picture capturing.

Definitely, in another embodiment, the input for stopping shooting may also be represented in another form, including but not limited to a character input or the like, which can be determined according to actual needs, and is not limited in this embodiment of this application.

Definitely, in some other embodiments, the second camera may further be controlled, through an automatic recognition technology, to end the picture capturing.

For example, in a case that a processor recognizes that the target moving object stops moving (stays still within a target time) or disappears (no light can be captured), the processor controls the second camera to stop the picture capturing.

Step 120: Synthesize the first picture and the second picture, and output a target picture.

In this step, the terminal may synthesize the first picture and the second picture based on the captured first picture and second picture, and output a synthesized target picture. The target picture is the light painting photo.

A size of the first picture and a size of the second picture may be the same. Step 120 may be implemented in the following manner. Pixels of a target region in the first picture are replaced with all pixels on the motion trajectory in the second picture. The target region is a region, corresponding to a position in a region in which the motion trajectory is located, in the first picture.

Because of pixel replacement, calculation of the whole synthesis is simple. In addition, transition between the motion trajectory and a background picture is smooth in the synthesized target picture.

In this manner, pixels in a corresponding position in the first picture are replaced with pixels corresponding to the motion trajectory in the second picture.

For example, for any pixel on the motion trajectory in the second picture, a coordinate position of the pixel in the second picture is (a, b). In this step, a pixel with a coordinate position (a, b) in the first picture needs to be replaced with the pixel with the coordinate position (a, b) in the second picture. Each pixel on the motion trajectory in the second picture is performed in the above manner. Therefore, synthesis of the two pictures may be implemented.

The first picture and the second picture are synthesized as follows:
  (1) the first picture is marked as A, and the second picture is marked as B;
  (2) another region in B, except a region for the motion trajectory, are transparent;
  (3) a size of A and a size of B are the same;
  (4) B may be directly overlaid on A, and the trajectory in B may directly replace the pixels in A; and (5) after replacement and overlaying, saving is performed, to complete the synthesis of the first picture and the second picture.

It should be noted that in the foregoing shooting method, the background picture of the light painting photo and the motion trajectory of the target moving object are captured separately. In this way, it is possible to edit or adjust the motion trajectory of the target moving object.

The shooting method according to this embodiment of this application may be applied to separate obtaining of the background picture of the light painting photo and the motion trajectory of the target moving object in a light painting capture scene. A user-defined motion trajectory of the target moving object may be implemented. Operability and interest of a shooting mode of a light painting camera are enhanced, and a finally finished photo is better.

In addition, a quantity of frames captured in a current capture scene is reduced, helping to reduce hardware power consumption.

In some embodiments, after step 110: a first camera captures a first picture, and, a second camera captures a second picture, the shooting method may further include:

receiving a first input performed by a user for the second picture; and adjusting, in response to the first input, a trajectory parameter of the motion trajectory in the second picture, and outputting a second picture with the trajectory parameter adjusted.

The step 120: synthesizing the first picture and the second picture includes synthesizing the first picture and the second picture with the trajectory parameter adjusted.

The first input may be expressed in at least one of the following manners.

First, the first input may be expressed as touch input, including but not limited to tap input, slide input, and press input.

In this implementation, the receiving the first input performed by a user may be represented as receiving a touch operation of the user in the display region of the terminal display screen.

The display region of the terminal display screen may display a target control. The target control includes various picture editing menus, including but not limited to zoom, sharpness adjustment, color palette, brightness adjustment, and the like. The first input may be implemented by touching the target control.

Second, the first input may be represented as a voice input.

In this embodiment, the terminal may trigger, when receiving a voice such as "enlarge by 20%", the motion trajectory of the target moving object to be enlarged by 20%.

Definitely, in another embodiment, the first input may also be represented in another form, including but not limited to a character input or the like, which can be determined according to actual needs, and is not limited in this embodiment of this application.

Adjusting the trajectory parameter of the motion trajectory in the second picture may change a display effect of the motion trajectory in the second picture. The trajectory parameter includes at least one parameter that characterizes a trajectory attribute of the motion trajectory.

The trajectory parameter includes but is not limited to at least one of the following: a color, a size, a position, an angle, a breakpoint, brightness, or the like.

Correspondingly, the adjusting the trajectory parameter of the motion trajectory in the second picture includes but is not limited to at least one of the following.

(1) A color of the motion trajectory is changed. For example, in a case that a waterfall is shot, an original color of the motion trajectory is generally white. A color of a palette on the display region of the terminal display screen is selected, to adjust the motion trajectory to be blue or green. Therefore, reflection of the waterfall on the blue sky or a tree is reflected, and a color effect of the target moving object is enhanced.

(2) A size of the motion trajectory is changed. For example, sometimes a big " ♡ " is to be drawn in a current image, but a range of the current image and the size of the motion trajectory are not easily controlled. A small " ♡ " may be drawn first. After the motion trajectory is generated, the size of the motion trajectory may be adjusted by touch control of a zoom control on the display region of the terminal display screen.

(3) A position of the current motion trajectory is changed. For example, after the second picture is captured, it is found that a position of the motion trajectory in the picture is not ideal. The motion trajectory may be moved to a target position by touch control of a translation control on the display region of the terminal display screen.

(4) An angle of the current motion trajectory is changed. For example, after the second picture is captured, it is found that a display angle of the motion trajectory is changed. The motion trajectory may be rotated to a target angle by touch control of a rotating control on the display region of the terminal display screen.

(5) A breakpoint of the motion trajectory is adjusted, such as drawing "i ♡u" with a light stick. It is difficult to present "i" clearly through a movement of a human arm. During operation, an "1" may be drawn directly. After a motion trajectory is generated, the "1" may be cut into two sections by touch control of an erase control on the display region of the terminal display screen.

(6) Brightness of the current motion trajectory is changed. For example, after the second picture is captured, it is found that the brightness of the motion trajectory is insufficient and it is difficult to form a prominent contrast with a background picture. The brightness of the motion trajectory may be increased by touch control of a brightness adjustment control on the display region of the terminal display screen.

In the prior art, when a light painting photo is shot, a motion trajectory of a target moving object is completely bound to a photographic plate. If the motion trajectory of the target moving object is not satisfactory, shooting can only be performed again.

In the shooting method according to this embodiment of this application, a motion trajectory of light may be edited or adjusted separately, thereby providing more flexible and interesting shooting experience, and a better shot picture.

It should be noted that whether editing is required may be set in advance, or editing is not required by default. An editing option is provided after shooting is completed.

Before step 110: a first camera captures a first picture, and a second camera captures a second picture, the shooting method may further include:

displaying a shooting preview interface.

In implementation, in a case that the input performed by a user for enabling the camera is received, the shooting preview interface is displayed in response to the input.

In this step, when the terminal receives the input, the display region of the terminal display screen displays the shooting preview interface, to help the user find a view.

The shooting preview interface may be expressed in at least one of the following manners.

Figure 2:
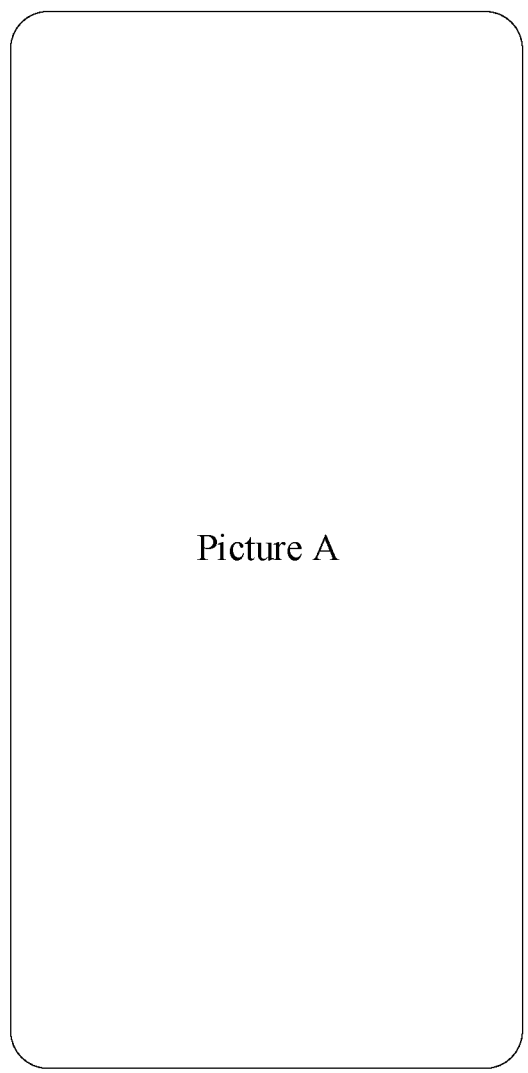
FIG. 2 is a schematic diagram of an interface for displaying a preview picture captured by a first camera, according to an embodiment of this application.

First, as shown in FIG. 2, a shooting preview interface is used to display a preview picture, Picture A, captured by a first camera.

In this manner, the shooting preview interface may display only the preview picture captured by the first camera. In this way, a relatively large view finding reference picture may be provided for the background picture of the light painting photo, helping to achieve overall composition of a picture.

Figure 3:
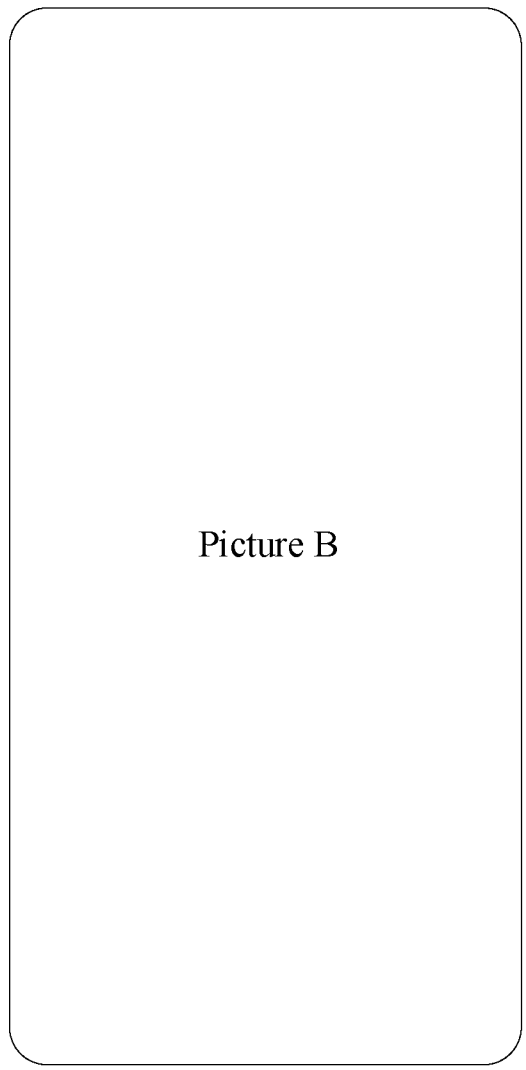
FIG. 3 is a schematic diagram of an interface for displaying a preview picture captured by a second camera, according to an embodiment of this application.

Second, as shown in FIG. 3, a shooting preview interface is used to display a preview picture, Picture B, captured by a second camera.

In this manner, the shooting preview interface may display only a preview picture captured by the second camera. In this way, a relatively large view finding reference picture may be provided for a motion trajectory in the light painting photo. Accordingly, the user may easily adjust a position and proportion of a target moving object in a photo before formal shooting.

Figure 4:
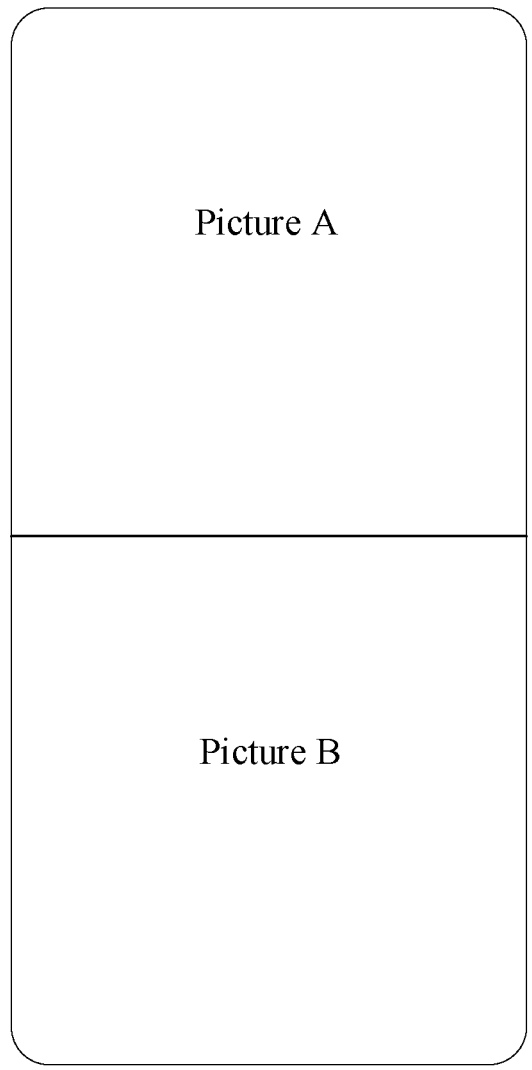
FIG. 4 is a schematic diagram of an interface for displaying preview pictures captured by a first camera and a second camera, according to an embodiment of this application.

Third, as shown in FIG. 4, a shooting preview interface includes a first shooting preview sub-interface and a second shooting preview sub-interface.

The first shooting preview sub-interface is used to display a preview picture, picture A, captured by a first camera. The second shooting preview sub-interface is used to display a preview picture, Picture B, captured by a second camera.

In this manner, the shooting preview interface is displayed in separate screens. The two sub-interfaces respectively display preview pictures captured by the first camera and the second camera. In this way, the user can not only easily adjust a position and proportion of a target moving object in a photo before formal shooting, but also adjust composition and layout of the whole photo before formal shooting.

Embodiments of this application will be described in detail from two different perspectives of implementation.

First, a first camera captures only a first picture.

In this case, during capturing of the first picture and a second picture, the shooting method may further include: controlling, when a motion trajectory starts to be generated, the first camera to stop capturing a picture.

In this way, an actual working time for the first camera to capture a complete capture scene is relatively short, helping to reduce power consumption of a terminal.

It can be understood that, in this embodiment, both the first camera and a second camera start, when receiving an input performed by a user for starting shooting, to capture pictures. When the motion trajectory starts to be generated, the first camera is controlled to stop capturing a picture, and the second camera is controlled to continue capturing a motion trajectory of a target moving object. In this way, during whole shooting, the first camera may capture at least one frame, thus minimizing power consumption without affecting a finished light painting photo.

Figure 6:
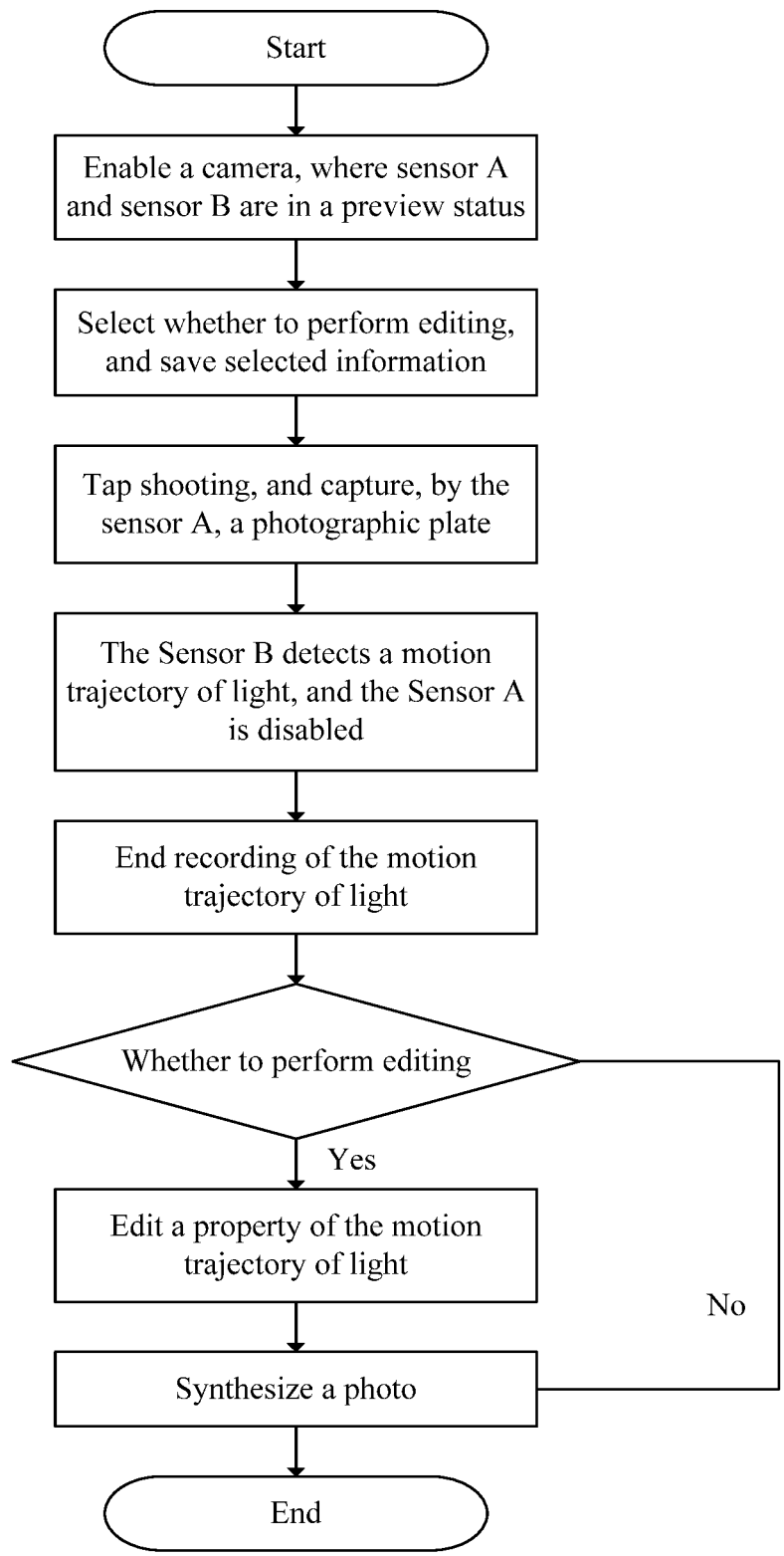
FIG. 6 is a detailed flowchart of a shooting method according to an embodiment of this application.

As shown in FIG. 6, in this case, an implementation flow of the shooting method is as follows.

Step 601: Enable a camera. In this case, preview is enabled for a first camera (sensor A) and a second camera (sensor B) simultaneously.

The first camera (sensor A) normally displays a preview picture of a current image. The second camera (sensor B) displays no image because there is no moving object in a current image.

Step 602: Before shooting, whether a user needs to perform editing may be set.

(1) If a user chooses not to edit, after final shooting is completed, a target picture (that is, a light painting photo) is automatically generated. Each trajectory attribute of a motion trajectory is the same as that captured by the second camera.

(2) If a user chooses editing, after shooting is completed, a first picture (photographic plate) and a second picture (photo of a motion trajectory) are output. After the user adjusts a trajectory parameter of a motion trajectory in the second picture, the second picture and the first picture are synthesized, to present a final target picture (that is, a light painting photo).

Step 603: The user clicks shooting. At this time, the first camera (sensor A) is exposed normally, and the first picture (photographic plate) is captured.

Step 604: When the second camera (sensor B) detects that a motion trajectory starts to be generated, the first camera (sensor A) is controlled to stop capturing a picture, and the second camera (Sensor B) always records a motion trajectory of a target moving object.

Step 605: After capturing of the motion trajectory is completed, click End.

Step 606: If the user selects No in step 602, synthesize the first picture and the second picture directly, and output a target picture (that is, a light painting photo).

If the user selects Yes in step 602, go to step 607.

Step 607: Adjust a trajectory parameter of the motion trajectory.

The shooting method according to this embodiment of this application may be applied to a capture scene where a person holds a fluorescent stick to draw a character or picture in the air. Before the target picture is generated, the motion trajectory of the target moving object may be customized and edited easily. Therefore, a finally formed target picture is better.

Figure 7:
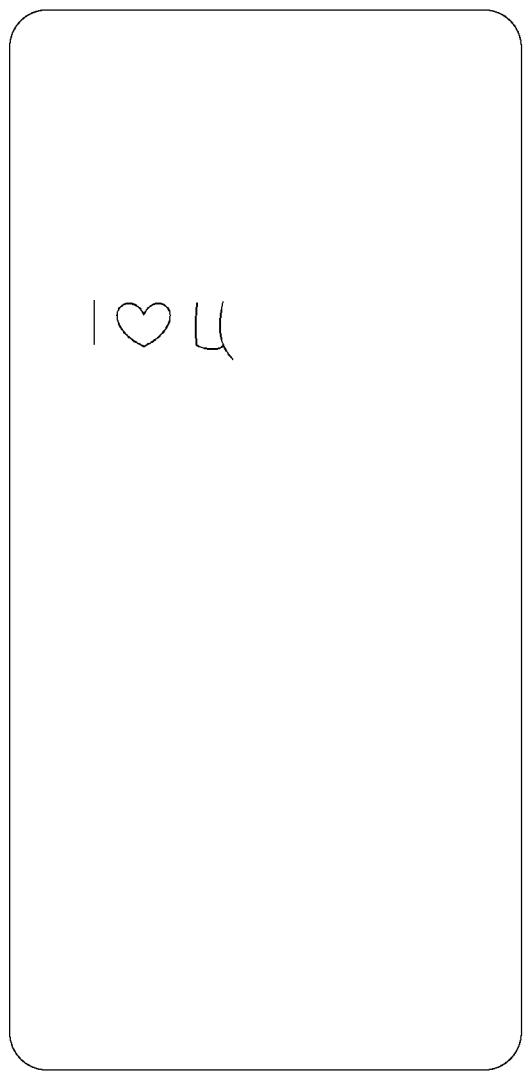
FIG. 7 is a first schematic diagram of an interface for displaying a second picture, according to an embodiment of this application.

In a case that a photographer holds a light stick and expects to draw "i ♡u" in the air, the target moving object captured by the second camera is the light stick. The captured second picture is shown in FIG. 7. The second picture has the following problems: (1) a proportion of the motion trajectory in the second picture is excessively small; (2) a position of the motion trajectory in the second picture is not ideal; and (3) for "i", "1" is actually captured.

In the following manner, the second picture may be edited independently of the first picture.

Figure 8:
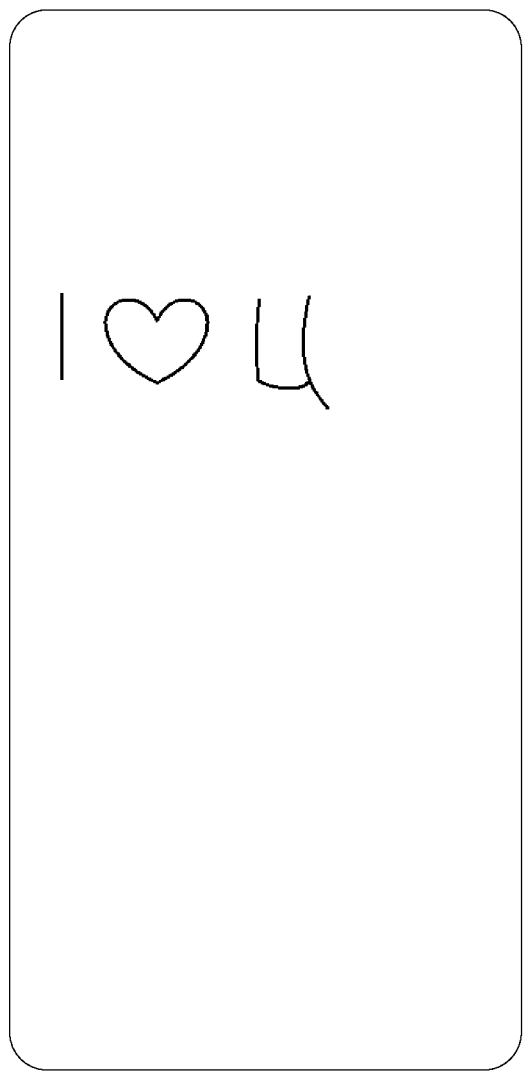
FIG. 8 is a second schematic diagram of an interface for displaying a second picture, according to an embodiment of this application.

(1) A size of the motion trajectory is adjusted by dragging the proportion of the motion trajectory in the current image, as shown in FIG. 7 because the proportion of the motion trajectory in the second picture is excessively small. The motion trajectory may be enlarged by touch control of a zoom control and selecting a target control indicating enlargement. Alternatively, the motion trajectory may also be enlarged by touch control of two points on the second picture simultaneously and dragging the two points in mutually deviating directions. FIG. 8 shows the second picture after the motion trajectory is enlarged.

Figure 9:
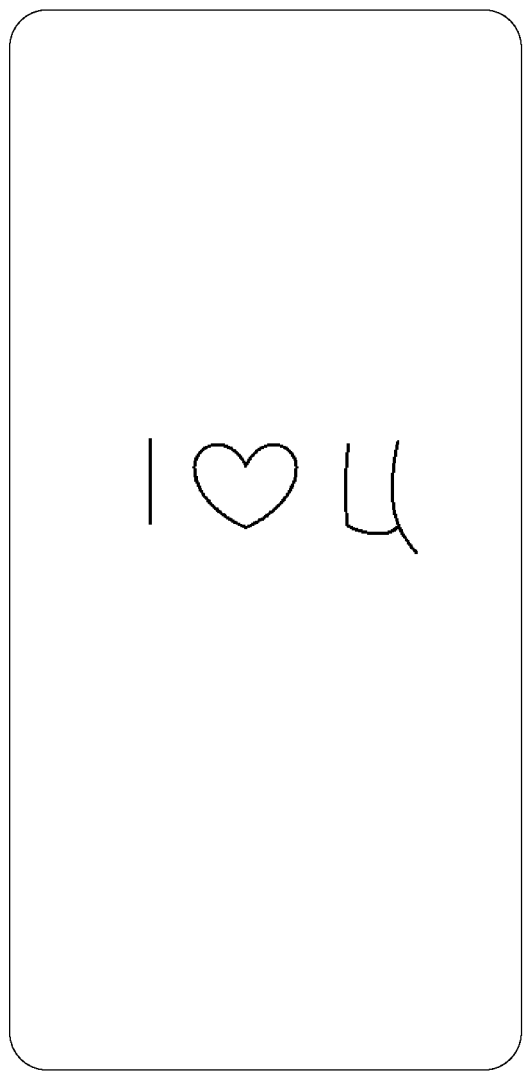
FIG. 9 is a third schematic diagram of an interface for displaying a second picture, according to an embodiment of this application.

(2) As shown in FIG. 8, the motion trajectory in the enlarged second picture is offset in an upper left region of the second picture. A position of the motion trajectory may be adjusted by pressing the motion trajectory and sliding the motion trajectory on a screen. FIG. 9 shows a second picture after the motion trajectory is moved. In this case, the motion trajectory is moved to a middle region.

Figure 10:
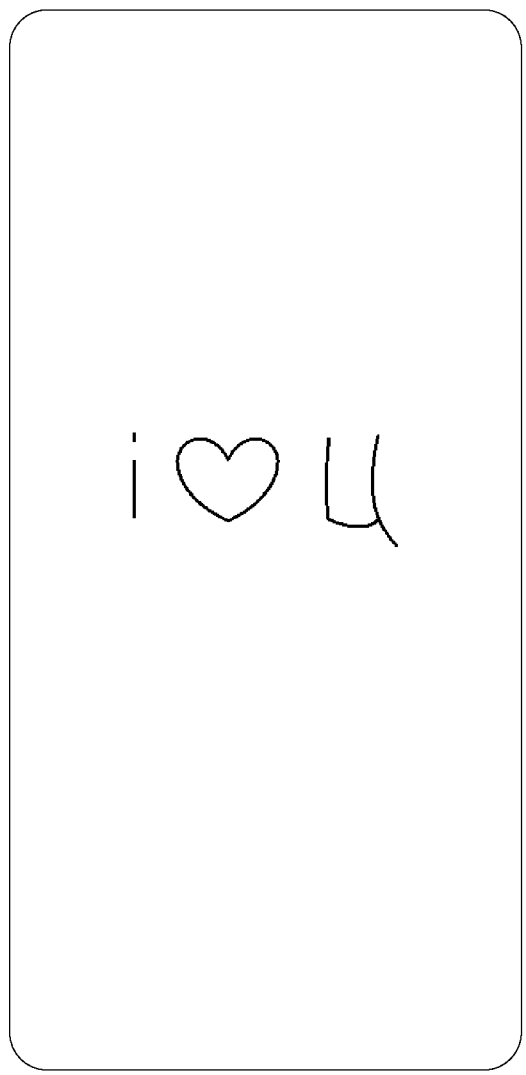
FIG. 10 is a fourth schematic diagram of an interface for displaying a second picture, according to an embodiment of this application.

(3) Because "i" is not easily drawn, a person holding a light stick may draw "1" directly. Therefore, a captured second picture actually shows "1 ♡u". "1" is cut into two sections by touch control of an erase control on the display region of the terminal display screen, and the "i" is output. In this way, the second picture is adjusted to "i ♡u" as shown in FIG. 10.

Definitely, a color, brightness, an angle, and the like of the motion trajectory may be further adjusted according to requirements, which is not repeated herein.

Step 608: Synthesize the second picture with the trajectory parameter adjusted, with the first picture, to generate a target picture (that is, the light painting photo), and end.

It should be noted that step 602 may also be located after step 605.

2. A first camera captures a first picture and a first video, and a second camera captures a second picture and a second video.

In this case, during capturing of the first picture and the second picture, the shooting method may further include:

capturing the first video and the second video, where the first video includes an image in a current capture scene, and the second video is used to record a process of forming the motion trajectory by the target moving object; and in a case that a second input performed by a user is received, playing the first video and the second video synchronously in response to the second input.

It can be understood that, in this embodiment, the first video may be captured by the first camera, and the second video may be captured by the second camera. Alternatively, the first video may be captured by a third camera, and the second video may be captured by a fourth camera.

Description is performed as follows by taking an example that the first camera captures the first video, and the second camera captures the second video.

It can be understood that, in this embodiment, both the first camera and a second camera start, when receiving an input performed by a user for starting shooting, to capture pictures. In addition, after the first camera captures the first picture, the first camera continues capturing the first video until receiving an input performed by a user for stopping shooting. In response to the input for stopping shooting, the first camera is controlled to stop capturing a video, and the second camera is controlled to stop capturing a video. Finally, the first picture, the second video, the first video, and the second video can be obtained. The first picture, the second picture, the first video, and the second video may be stored in a picture library, and the first video and the second video are automatically associated.

In this way, in the shooting method, not only the target picture can be output, but also the first video and the second video used to characterize a generation process of a target picture may also be output. In addition, by playing the first video and the second video simultaneously, the generation process of the target picture may be displayed in a visualized manner, which is interesting and has an extremely high commercial prospect.

In this case, an implementation flow of the shooting method is as follows.

Step 701: Enable a camera. In this case, preview is enabled for a first camera (sensor A) and a second camera (sensor B) simultaneously.

The first camera (sensor A) normally displays a preview of a current image. The second camera (sensor B) displays no image because there is no moving object in a current image.

Step 702: Before shooting, whether a user needs to perform editing may be set.

(1) If a user chooses not to edit, after final shooting is completed, a target picture (that is, a light painting photo) is automatically generated. Each trajectory attribute of a motion trajectory is the same as that captured by the second camera.

(2) If a user chooses editing, after shooting is completed, a first picture (photographic plate) and a second picture (photo of a motion trajectory) are output. After the user adjusts a trajectory parameter of a motion trajectory in the second picture, the second picture and the first picture are synthesized, to present a final target picture (that is, a light painting photo).

Step 703: The user clicks shooting. At this time, the first camera (sensor A) is exposed normally, and the first picture (photographic plate) is captured. In addition, video recording is started. A first video (video A) is generated finally.

Step 704: The second camera (sensor B) always records the motion trajectory of the target moving object, and records an image generated by the motion trajectory to generate a second video (video B).

Step 705: After capturing of the motion trajectory is completed, click End.

Step 706: If the user selects No in step 702, synthesize the first picture and the second picture directly, and output a target picture (that is, the light painting photo) and an associated first video and second video.

If the user selects Yes in step 702, go to step 707.

Step 707: Adjust a trajectory parameter of the motion trajectory in a manner with reference to the description of the previous embodiment.

Step 708: Synthesize the second picture with the trajectory parameter adjusted, with the first picture, to generate a target picture (that is, a light painting photo), and the associated first video and second video, and end.

It should be noted that step 702 may also be located after step 705.

The shooting method may further include the following step: in a case that a second input performed by a user is received, playing the first video and the second video synchronously in response to the second input.

Figure 5:
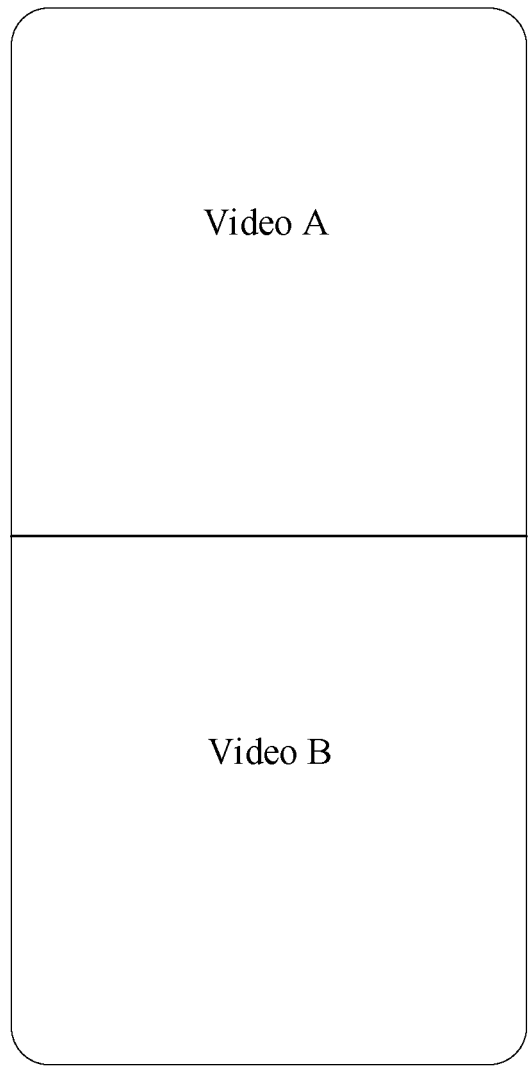
FIG. 5 is a first schematic diagram of an interface for playing a first video and a second video, according to an embodiment of this application.

In this step, the second input is used to play the first video and the second video synchronously on a play interface. In addition, as shown in FIG. 5, the play interface includes a first play sub-interface and a second play sub-interface. The first play sub-interface is used to play the first video (Video A), and the second play sub-interface is used to play the second video (Video B). The two videos are displayed in separate screens. By comparison of the two videos, a whole process of generation of the target picture can be seen.

The second input may be expressed in at least one of the following manners.

First, the second input may be expressed as touch input, including but not limited to tap input, slide input, and press input.

In this implementation, the receiving the second input performed by a user may be represented as receiving a touch operation of the user in a display region of a terminal display screen.

For example, in a picture library, the first video is tapped, the second video is tapped, or the first video and the second video are displayed in a same control, and the control is tapped. Both the first video and the second video can be played simultaneously in separate screens.

Second, the second input may be represented as a voice input.

In this embodiment, the terminal may play the first video and the second video synchronously in separate screens when receiving a voice, such as "Play a video of light painting photos".

Definitely, in another embodiment, the second input may also be represented in another form, including but not limited to a character input or the like, which can be determined according to actual needs, and is not limited in this embodiment of this application.

The foregoing shooting method has strong operability and interest, and can also achieve a relatively good result in a case of a poor light source. In addition, a real video for drawing a motion trajectory of a moving target and dynamic images generated by the motion trajectory are obtained.

It should be noted that content of the second video is represented in the following two forms.

First, a video frame of the second video includes a continuous trajectory of the target moving object in a time period from the beginning of capturing to a corresponding moment of the video frame.

In this embodiment, an $i^{th}$ video frame of the second video includes a motion trajectory of the target moving object in an $i^{th}$ time period. The $i^{th}$ time period is a time period between a $1^{st}$ moment and an $i^{th}$ moment. The $1^{st}$ moment is a moment when a $1^{st}$ video frame is captured. The $i^{th}$ time is a moment when the $i^{th}$ video frame is captured.

i is a positive integer. The $i^{th}$ video frame is any video frame in the second video.

Figure 11:
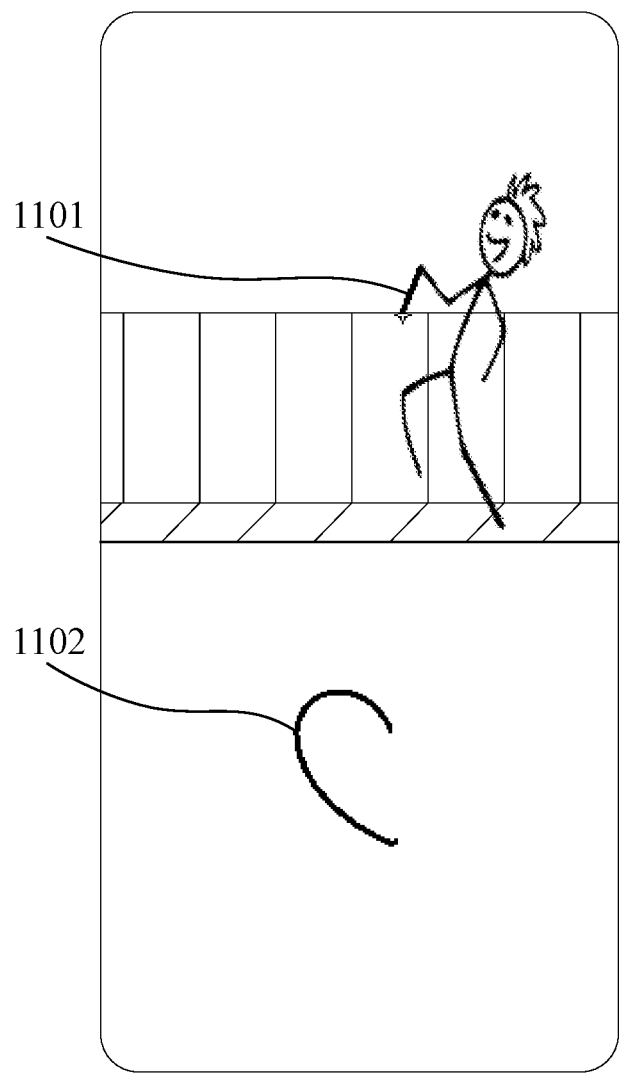
FIG. 11 is a second schematic diagram of an interface for playing a first video and a second video, according to an embodiment of this application.

In a case that a photographer holds a light stick 1101 and wants to draw a " ▽ " in the air, a start point of drawing is an intersection in the middle of an upper part of " ▽ ". At a $10^{th}$ moment, the light stick 1101 moves to an intersection point in the middle of a lower part, and a $10^{th}$ video frame of the second video is shown in FIG. 11. The $10^{th}$ video frame is used to represent a motion trajectory 1102 of the light stick 1101 during a time period from the $1^{st}$ moment to the $10^{th}$ moment.

In the foregoing method, when the first video and the second video are played synchronously, the first video is used to show images of all objects in a capture scene, and the second video is used to show a continuous generation process of the motion trajectory of the target moving object from nothing. Intuitive display of the generation process of the target picture may be displayed intuitively, helping to increase the interest of shooting.

Second, the video frame of the second video includes display position information of the target moving object at a moment corresponding to a current frame.

The display position information indicates a position of a moving object in the current frame at the moment corresponding to the current frame. The display position information is displayed as a light spot in the current frame.

In this embodiment, the $i^{th}$ video frame of the second video is a captured picture of the target moving object at the $i^{th}$ moment. The $i^{th}$ moment is a time when the $i^{th}$ video frame is captured.

i is a positive integer. The $i^{th}$ video frame is any video frame in the second video.

Figure 12:
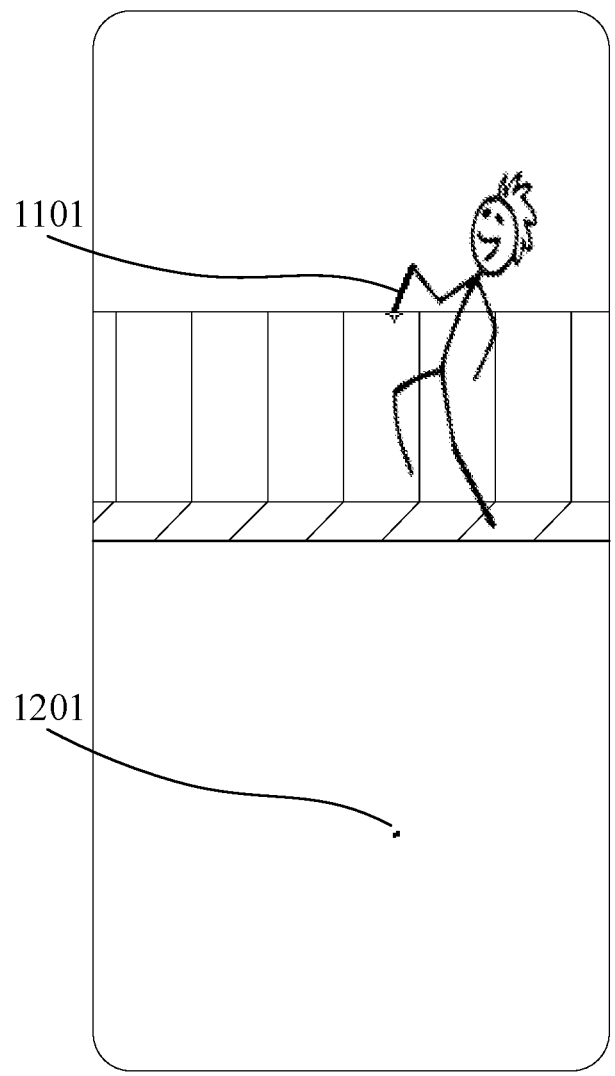
FIG. 12 is a third schematic diagram of an interface for playing a first video and a second video, according to an embodiment of this application.

In a case that a photographer holds a light stick 1101 and wants to draw a " ▽ " in the air, a start point of drawing is an intersection in the middle of an upper part of " ▽ ". At a $10^{th}$ moment, the light stick 1101 moves to an intersection point in the middle of a lower part. As shown in FIG. 12, a $10^{th}$ video frame of the second video is displayed as a light spot. The $10^{th}$ video frame is a picture of the light stick 1101 captured at the $10^{th}$ moment. The picture includes only display position information of the light stick 1101 at the $10^{th}$ moment. The display position information may be expressed by a position of the light spot 1201 of the light stick in the $10^{th}$ video frame.

In the foregoing method, when the first video and the second video are played synchronously, the first video is used to show images of all objects in a capture scene, and the second video is used to show a position change process of the target moving object. In addition, an image of the target moving object in the second video is close to a real scene. Therefore, a background and foreground during generation of the target picture may be displayed comparatively, helping to increase the interest of shooting.

It should be noted that the shooting method provided in this embodiment of this application may be performed by a shooting apparatus or a control module, in the shooting apparatus, configured to perform and load the shooting method.

An embodiment of this application further provides a shooting apparatus.

Figure 13:
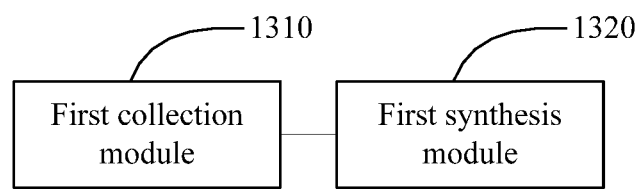
FIG. 13 is a structural diagram of a shooting apparatus according to an embodiment of this application.

As shown in FIG. 13, the shooting apparatus includes a first capturing module 1310 and a first synthesis module 1320.

The first capturing module 1310 is configured to capture a first picture by a first camera, and capture a second picture by a second camera. The first picture includes an image in a current capture scene. The second camera is configured to capture a motion trajectory of a target moving object. The first picture includes the target moving object.

The first synthesis module 1320 is configured to synthesize the first picture and the second picture, and output a target picture.

In some embodiments, the shooting apparatus may further include:
a first receiving module, configured to receive a first input performed by a user for the second picture; and
a first adjustment module, configured to adjust, in response to the first input, a trajectory parameter of the motion trajectory in the second picture, and output a second picture with the trajectory parameter adjusted.

The first synthesis module 1320 is further configured to synthesize the first picture and the second picture with the trajectory parameter adjusted.

The trajectory parameter includes at least one parameter that characterizes a trajectory attribute of the motion trajectory.

In some embodiments, a size of the first picture and a size of the second picture are the same.

The first synthesis module 1320 is configured to replace pixels of a target region in the first picture with all pixels on a motion trajectory in the second picture. The target region is a region, corresponding to a position in a region in which the motion trajectory is located, in the first picture.

In some embodiments, the shooting apparatus may further include:
a first display module, configured to display a shooting preview interface.

The shooting preview interface is used to display a preview picture captured by the first camera.

Alternatively, the shooting preview interface is used to display a preview picture captured by the second camera.

Alternatively, the shooting preview interface includes a first shooting preview sub-interface and a second shooting preview sub-interface. The first shooting preview sub-interface is used to display a preview picture captured by the first camera. The second shooting preview sub-interface is used to display a preview picture captured by the second camera.

In some embodiments, the shooting apparatus may further include:

a first control module, configured to control, in a case that the motion trajectory starts to be generated, the first camera to stop capturing a picture.

In some embodiments, the shooting apparatus may further include:

a second capturing module, configured to capture a first video and a second video, where the first video includes an image in a current capture scene, and the second video is used to record a motion process of the target moving object; and a first play module, configured to play, in a case that a second input performed by a user is received, the first video and the second video synchronously in response to the second input.

In some embodiments, an $i^{th}$ video frame of the second video includes a motion trajectory of the target moving object in an $i^{th}$ time period. The $i^{th}$ time period is a time period between a $1^{st}$ moment and an $i^{th}$ moment. The $1^{st}$ moment is a moment when the $1^{st}$ video frame is captured. The $i^{th}$ time is a moment when the $i^{th}$ video frame is captured.

Alternatively, the $i^{th}$ video frame of the second video is a captured picture of the target moving object at the $i^{th}$ moment. The $i^{th}$ moment is a time when the $i^{th}$ video frame is captured.

i is a positive integer. The $i^{th}$ video frame is any video frame in the second video.

In the shooting apparatus according to this embodiment of this application, a background picture of a light painting photo and the motion trajectory of the target moving object are obtained separately. A user-defined motion trajectory of the target moving object may be implemented. Operability and interest of a shooting mode of a light painting camera are enhanced, and a finally finished photo is better. In addition, a quantity of frames captured in a current capture scene is reduced, helping to reduce hardware power consumption.

The shooting apparatus in this embodiment of this application may be an apparatus, or a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic device, a wearable device, an ultra-mobile personal computer (UMPC), a netbook, or a personal digital assistant (PDA). The non-mobile electronic device may be a personal computer (PC), a television (TV), an automated teller machine, or a self-service machine. This is not specifically limited in this embodiment of this application.

The shooting apparatus in this embodiment of this application may be an apparatus with an operating system. The operating system may be an Android operating system, may be an iOS operating system, or may be another possible operating system, which is not specifically limited in the embodiments of this application.

The shooting apparatus according to an embodiment of this application can implement processes implemented by the shooting apparatus in the method embodiment of FIG. 1 or FIG. 6. To avoid repetition, details are not described herein again.

Figure 14:
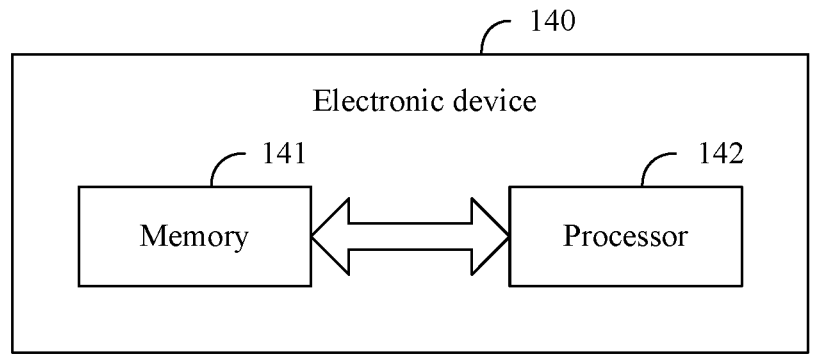
FIG. 14 is a first schematic diagram of a structure of an electronic device according to an embodiment of this application.

As shown in FIG. 14, an embodiment of this application further provides an electronic device 140, including a processor 142, a memory 141, and a program or an instruction stored in the memory 141 and capable of running on the processor 142. When the program or the instruction is executed by the processor 142, the processes of the foregoing shooting method embodiment are implemented and a same technical effect can be achieved. To avoid repetition, details are not described herein again.

It should be noted that the electronic device in this embodiment of this application includes the foregoing mobile electronic device and the foregoing non-mobile electronic device.

Figure 15:
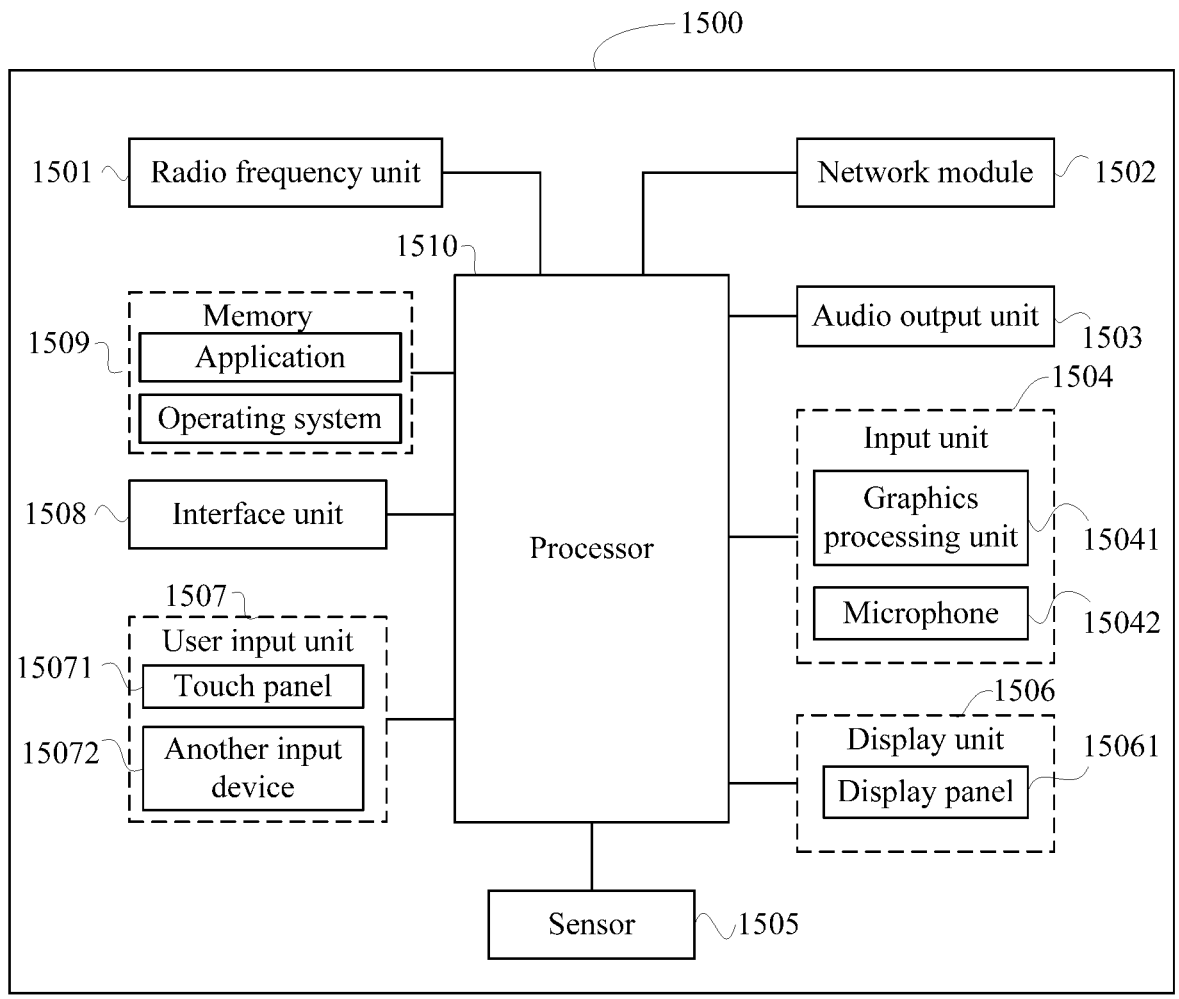
FIG. 15 is a second schematic diagram of hardware of an electronic device according to an embodiment of this application.

FIG. 15 is a schematic structural diagram of hardware of an electronic device according to an embodiment of this application.

The electronic device 1500 includes but is not limited to components such as a radio frequency unit 1501, a network module 1502, an audio output unit 1503, an input unit 1504, a sensor 1505, a display unit 1506, a user input unit 1507, an interface unit 1508, a memory 1509, and a processor 1510.

A person skilled in the art can understand that the electronic device 1500 may further include a power supply (such as a battery) that supplies power to each component. The power supply may be logically connected to the processor 1510 by using a power supply management system, to implement functions such as charging and discharging management, and power consumption management by using the power supply management system. The structure of the electronic device shown in FIG. 15 does not constitute a limitation on the electronic device. The electronic device may include components more or fewer components than those shown in the diagram, a combination of some components, or different component arrangements. Details are not described herein.

The input unit 1504 is configured to capture a first picture by a first camera, and capture a second picture by a second camera. The first picture includes an image in a current capture scene. The second camera is configured to capture a motion trajectory of a target moving object. The first picture includes the target moving object.

The processor 1510 is configured to synthesize the first picture and the second picture, and output a target picture.

For the electronic device according to this embodiment of this application, a background picture of a light painting photo and the motion trajectory of the target moving object are obtained separately. A user-defined motion trajectory of the target moving object may be implemented. Operability and interest of a shooting mode of a light painting camera are enhanced, and a finally finished photo is better. In addition, a quantity of frames captured in a current capture scene is reduced, helping to reduce hardware power consumption.

In some embodiments, the user input unit 1507 is configured to receive a first input performed by a user for the second picture.

The processor 1510 is further configured to adjust, in response to the first input, a trajectory parameter of a motion trajectory in the second picture, and output a second picture with the trajectory parameter adjusted.

The processor 1510 is further configured to synthesize the first picture and the second picture with the trajectory parameter adjusted.

The trajectory parameter includes at least one parameter that characterizes a trajectory attribute of the motion trajectory.

In some embodiments, a size of the first picture and a size of the second picture are the same. The processor 1510 is further configured to replace pixels of a target region in the first picture with all pixels on the motion trajectory in the second picture. The target region is a region, corresponding to a position in a region in which the motion trajectory is located, in the first picture.

In some embodiments, the display unit 1506 is configured to display a shooting preview interface.

The shooting preview interface is used to display a preview picture captured by the first camera.

Alternatively, the shooting preview interface is used to display a preview picture captured by the second camera.

Alternatively, the shooting preview interface includes a first shooting preview sub-interface and a second shooting preview sub-interface. The first shooting preview sub-interface is used to display a preview picture captured by the first camera. The second shooting preview sub-interface is used to display a preview picture captured by the second camera.

In some embodiments, the processor 1510 is further configured to control, in a case that the motion trajectory starts to be generated, the first camera to stop capturing a picture.

In some embodiments, the input unit 1504 is further configured to capture a first video and a second video. The first video includes an image in a current capture scene. The second video is used to record a process of forming the motion trajectory by the target moving object.

The display unit 1506 is further configured to play, in a case that a second input performed by a user is received, the first video and the second video synchronously in response to the second input.

It should be noted that the electronic device 1500 in this embodiment can implement each process in the foregoing method embodiments in the embodiments of this application, and achieve a same beneficial effect. To avoid repetition, details are not described herein again.

It should be noted that, in this embodiment of this application, the input unit 1504 may include a graphics processing unit (GPU) 15041 and a microphone 15042. The graphics processing unit 15041 processes picture data of a static picture or video obtained by a picture capture apparatus (such as a camera) in a video capture mode or a picture capture mode. The display unit 1506 may include a display panel 15061, and the display panel 15061 may be configured in a form of a liquid crystal display, an organic light-emitting diode, or the like. The user input unit 1507 includes a touch panel 15071 and another input device 15072. The touch panel 15071 is also referred to as a touchscreen. The touch panel 15071 may include two parts: a touch detection apparatus and a touch controller. The another input device 15072 may include but is not limited to a physical keyboard, a functional button (such as a volume control button or a power on/off button), a trackball, a mouse, and a joystick. Details are not described herein. The memory 1509 may be configured to store a software program and various pieces of data, including but not limited to an application and an operating system. An application processor and a modem processor may be integrated into the processor 1510. The application processor mainly processes an operating system, a user interface, an application, and the like. The modem processor mainly processes wireless communication. It can be understood that, alternatively, the modem processor may not be integrated into the processor 1510.

An embodiment of this application further provides a readable storage medium. The readable storage medium stores a program or an instruction. When the program or the instruction is executed by a processor, the processes of the shooting method embodiment are implemented, and a same technical effect can be achieved. To avoid repetition, details are not provided herein again.

The processor is a processor in the electronic device in the foregoing embodiment. An example of the readable storage medium includes a non-transient computer-readable storage medium such as a computer read-only memory (ROM), a random access memory (RAM), a magnetic disk, or an optical disc.

An embodiment of this application further provides an electronic device, including that the electronic device is configured to perform processes of the foregoing shooting method embodiment, and a same technical effect can be achieved. To avoid repetition, details are not repeat herein again.

An embodiment of this application further provides a computer program product. The computer program product may be executed by a processor to implement processes of the foregoing shooting method embodiment, and a same technical effect can be achieved. To avoid repetition, details are not described herein again.

An embodiment of this application further provides a chip. The chip includes a processor and a communication interface. The communication interface is coupled to the processor. The processor is configured to run a program or an instruction to implement the processes of the foregoing shooting method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element. In addition, it should be noted that the scope of the methods and apparatuses in the implementations of this application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such understanding, the technical solutions of this application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

The embodiments of this application are described above with reference to the accompanying drawings, but this application is not limited to the foregoing implementation manners. The foregoing implementation manners are merely schematic instead of restrictive. Under enlightenment of this application, a person of ordinary skills in the art may make many forms without departing from aims and the protection scope of claims of this application, all of which fall within the protection scope of this application.

What is claimed is:

1. A light painting picture shooting method, comprising:
capturing, by a first camera, a first picture, and, capturing, by a second camera, a second picture,
wherein the first picture comprises an image in a current capture scene,
wherein the first picture is used to generate a background picture of a target picture,
wherein the second camera is configured to capture a motion trajectory of a target moving object,
wherein the second camera comprises a dynamic vision sensor (DVS) and wherein the first picture comprises the target moving object; and
synthesizing the first picture and the second picture, and outputting a target picture, wherein the target picture is a light painting picture.

2. The shooting method according to claim 1, wherein after the capturing, by a first camera, a first picture, and, capturing, by a second camera, a second picture, the method further comprises:
receiving a first input performed by a user for the second picture; and
adjusting, in response to the first input, a trajectory parameter of the motion trajectory in the second picture, and outputting a second picture with the trajectory parameter adjusted; and
the synthesizing the first picture and the second picture comprises:
synthesizing the first picture and the second picture with the trajectory parameter adjusted,
wherein the trajectory parameter comprises at least one parameter that characterizes a trajectory attribute of the motion trajectory.

3. The shooting method according to claim 1, wherein a size of the first picture and a size of the second picture are the same; and
the synthesizing the first picture and the second picture comprises:
replacing pixels of a target region in the first picture with all pixels on the motion trajectory in the second picture, wherein the target region is a region, corresponding to a position in a region in which the motion trajectory is located, in the first picture.

4. The shooting method according to claim 1, wherein before the capturing, by a first camera, a first picture, and, capturing, by a second camera, a second picture, the method further comprises:
displaying a shooting preview interface, wherein
the shooting preview interface is used to display a preview picture captured by the first camera;
the shooting preview interface is used to display a preview picture captured by the second camera; or
the shooting preview interface comprises a first shooting preview sub-interface and a second shooting preview sub-interface, wherein the first shooting preview sub-interface is used to display a preview picture captured by the first camera, and the second shooting preview sub-interface is used to display a preview picture captured by the second camera.

5. The shooting method according to claim 1, wherein during capturing of the first picture and the second picture, the method further comprises:
controlling, in a case that the motion trajectory starts to be generated, the first camera to stop capturing a picture.

6. The shooting method according to claim 1, wherein during capturing of the first picture and the second picture, the method further comprises:
capturing a first video and a second video, wherein the first video comprises an image in a current capture scene, and the second video is used to record a process of forming the motion trajectory by the target moving object; and
in a case that a second input performed by a user is received, playing the first video and the second video synchronously in response to the second input.

7. The shooting method according to claim 6, wherein an $i^{th}$ video frame of the second video comprises a motion trajectory of the target moving object in an $i^{th}$ time period, the $i^{th}$ time period is a time period between a $1^{st}$ moment and an $i^{th}$ moment, the $1^{st}$ moment is a moment when a $1^{st}$ video frame is captured, and the $i^{th}$ time is a moment when the $i^{th}$ video frame is captured; or
an $i^{th}$ video frame of the second video is a captured picture of the target moving object at an $i^{th}$ moment, and the $i^{th}$ moment is a time when the $i^{th}$ video frame is captured,
wherein i is a positive integer, and the $i^{th}$ video frame is any video frame in the second video.

8. An electronic device, comprising:
a processor; and
a memory storing a program or an instruction that is capable of running on the processor, wherein the program or the instruction, when executed by the processor, causes the electronic device to perform the following steps:
capturing, by a first camera, a first picture, and, capturing, by a second camera, a second picture,
wherein the first picture comprises an image in a current capture scene, wherein the first picture is used to generate a background picture of a target picture,
wherein the second camera is configured to capture a motion trajectory of a target moving object,
wherein the second camera comprises a dynamic vision sensor (DVS) and wherein the first picture comprises the target moving object; and
synthesizing the first picture and the second picture, and outputting a target picture, wherein the target picture is a light painting picture.

9. The electronic device according to claim 8, wherein after the capturing, by a first camera, a first picture, and, capturing, by a second camera, a second picture, the program or the instruction, when executed by the processor, causes the electronic device to further perform the following steps:
receiving a first input performed by a user for the second picture; and
adjusting, in response to the first input, a trajectory parameter of the motion trajectory in the second picture, and outputting a second picture with the trajectory parameter adjusted; and
the synthesizing the first picture and the second picture comprises:
synthesizing the first picture and the second picture with the trajectory parameter adjusted, wherein the trajectory parameter comprises at least one parameter that characterizes a trajectory attribute of the motion trajectory.

10. The electronic device according to claim 8, wherein a size of the first picture and a size of the second picture are the same; and the synthesizing the first picture and the second picture comprises:

replacing pixels of a target region in the first picture with all pixels on the motion trajectory in the second picture, wherein the target region is a region, corresponding to a position in a region in which the motion trajectory is located, in the first picture.

11. The electronic device according to claim 8, wherein before the capturing, by a first camera, a first picture, and, capturing, by a second camera, a second picture, the program or the instruction, when executed by the processor, causes the electronic device to perform the following steps:

displaying a shooting preview interface, wherein
the shooting preview interface is used to display a preview picture captured by the first camera;
the shooting preview interface is used to display a preview picture captured by the second camera; or
the shooting preview interface comprises a first shooting preview sub-interface and a second shooting preview sub-interface, wherein the first shooting preview sub-interface is used to display a preview picture captured by the first camera, and the second shooting preview sub-interface is used to display a preview picture captured by the second camera.

12. The electronic device according to claim 8, wherein during capturing of the first picture and the second picture, the program or the instruction, when executed by the processor, causes the electronic device to further perform the following steps:

controlling, in a case that the motion trajectory starts to be generated, the first camera to stop capturing a picture.

13. The electronic device according to claim 8, wherein during capturing of the first picture and the second picture, the program or the instruction, when executed by the processor, causes the electronic device to further perform the following steps:

capturing a first video and a second video, wherein the first video comprises an image in a current capture scene, and the second video is used to record a process of forming the motion trajectory by the target moving object; and in a case that a second input performed by a user is received, playing the first video and the second video synchronously in response to the second input.

14. The electronic device according to claim 13, wherein an $i^{th}$ video frame of the second video comprises a motion trajectory of the target moving object in an $i^{th}$ time period, the $i^{th}$ time period is a time period between a $1^{st}$ moment and an $i^{th}$ moment, the $1^{st}$ moment is a moment when a $1^{st}$ video frame is captured, and the $i^{th}$ time is a moment when the $i^{th}$ video frame is captured; or an $i^{th}$ video frame of the second video is a captured picture of the target moving object at an $i^{th}$ moment, and the $i^{th}$ moment is a time when the $i^{th}$ video frame is captured, wherein i is a positive integer, and the $i^{th}$ video frame is any video frame in the second video.

15. A non-transitory readable storage medium storing a program or an instruction, wherein the program or the instruction, when executed by a processor, causes the processor to perform the following steps:

capturing, by a first camera, a first picture, and, capturing, by a second camera, a second picture,
wherein the first picture comprises an image in a current capture scene,
wherein the first picture is used to generate a background picture of a target picture,
wherein the second camera is configured to capture a motion trajectory of a target moving object,
wherein the second camera comprises a dynamic vision sensor (DVS) and wherein the first picture comprises the target moving object; and
synthesizing the first picture and the second picture, and outputting a target picture, wherein the target picture is a light painting picture.

16. The non-transitory readable storage medium according to claim 15, wherein after the capturing, by a first camera, a first picture, and, capturing, by a second camera, a second picture, the program or the instruction, when the program or the instruction, when executed by a processor, causes the processor to further perform the following steps:

receiving a first input performed by a user for the second picture; and
adjusting, in response to the first input, a trajectory parameter of the motion trajectory in the second picture, and outputting a second picture with the trajectory parameter adjusted; and
the synthesizing the first picture and the second picture comprises:
synthesizing the first picture and the second picture with the trajectory parameter adjusted,
wherein the trajectory parameter comprises at least one parameter that characterizes a trajectory attribute of the motion trajectory.

17. The non-transitory readable storage medium according to claim 15, wherein a size of the first picture and a size of the second picture are the same; and the synthesizing the first picture and the second picture comprises:

replacing pixels of a target region in the first picture with all pixels on the motion trajectory in the second picture, wherein the target region is a region, corresponding to a position in a region in which the motion trajectory is located, in the first picture.

18. The non-transitory readable storage medium according to claim 15, wherein before the capturing, by a first camera, a first picture, and, capturing, by a second camera, a second picture, the program or the instruction, when executed by a processor, causes the processor to perform the following steps:

displaying a shooting preview interface, wherein
the shooting preview interface is used to display a preview picture captured by the first camera;
the shooting preview interface is used to display a preview picture captured by the second camera; or
the shooting preview interface comprises a first shooting preview sub-interface and a second shooting preview sub-interface, wherein the first shooting preview sub-interface is used to display a preview picture captured by the first camera, and the second shooting preview sub-interface is used to display a preview picture captured by the second camera.

19. The non-transitory readable storage medium according to claim 15, wherein during capturing of the first picture and the second picture, the program or the instruction, when executed by a processor, causes the processor to further perform the following steps:

controlling, in a case that the motion trajectory starts to be generated, the first camera to stop capturing a picture.

20. The non-transitory readable storage medium according to claim 15, wherein during capturing of the first picture and the second picture, the program or the instruction, when executed by a processor, causes the processor to further perform the following steps:
- capturing a first video and a second video, wherein the first video comprises an image in a current capture scene, and the second video is used to record a process of forming the motion trajectory by the target moving object; and
- in a case that a second input performed by a user is received, playing the first video and the second video synchronously in response to the second input.

* * * * *